(12) United States Patent
Ludwig (10) Patent No.: US 8,988,068 B2
(45) Date of Patent: Mar. 24, 2015

(54) SENSOR ARRANGEMENT

(75) Inventor: Ronny Ludwig, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 13/410,361

(22) Filed: Mar. 2, 2012

(65) Prior Publication Data

US 2012/0223703 A1 Sep. 6, 2012

(30) Foreign Application Priority Data

Mar. 3, 2011 (DE) .................. 10 2011 005 066

(51) Int. Cl.
*G01B 7/30* (2006.01)
*G01D 5/14* (2006.01)
*G01D 5/245* (2006.01)

(52) U.S. Cl.
CPC .............. *G01D 5/145* (2013.01); *G01D 5/2451* (2013.01)
USPC .................................................. 324/207.25

(58) Field of Classification Search
CPC ....... G01D 5/145; G01D 5/00; G01D 5/2451; G01D 5/24485; G01D 11/245; G01B 7/30; G01B 5/24
USPC .................................................. 324/207.25
See application file for complete search history.

(56) References Cited

U.S. PATENT DOCUMENTS

| | | | |
|---|---|---|---|
| 6,761,075 B2 * | 7/2004 | Steinlechner et al. ... | 73/862.326 |
| 7,133,764 B2 * | 11/2006 | Kassner ..................... | 701/112 |
| 7,589,522 B2 * | 9/2009 | Knecht et al. ............ | 324/207.21 |
| 8,294,457 B2 * | 10/2012 | Schrubbe et al. ........ | 324/207.25 |
| 2009/0072816 A1 * | 3/2009 | Schrubbe et al. .......... | 324/207.2 |
| 2009/0309585 A1 | 12/2009 | Iijima et al. | |
| 2010/0066353 A1 | 3/2010 | Iijima et al. | |
| 2010/0107747 A1 * | 5/2010 | Rolew et al. .............. | 73/114.26 |
| 2012/0038348 A1 * | 2/2012 | Aimuta et al. ............ | 324/207.24 |
| 2012/0210791 A1 * | 8/2012 | Pannek ...................... | 73/514.02 |
| 2013/0015862 A1 * | 1/2013 | Ludwig ........................ | 324/658 |
| 2013/0218517 A1 * | 8/2013 | Ausserlechner .......... | 324/207.13 |
| 2013/0221957 A1 * | 8/2013 | Ludwig .................... | 324/207.25 |

FOREIGN PATENT DOCUMENTS

| | | | | |
|---|---|---|---|---|
| EP | 2078930 A1 * | 7/2009 | ............... | G01D 5/18 |
| EP | 2080991 A1 * | 7/2009 | ............... | G01D 5/18 |

* cited by examiner

*Primary Examiner* — Jermele M Hollington
(74) *Attorney, Agent, or Firm* — Michael Best & Friedrich LLP (57) ABSTRACT

A sensor arrangement (2) for determining a rotational angle of a shaft (4) which has at least one locking ring (12) arranged on the shaft (4), wherein a radius of an outer face (40) of the at least one locking ring (12) changes with a period of $n\phi/360°$, and wherein the sensor arrangement (2) has at least one first fixedly installed magnetic sensor (32) which is assigned to the at least one locking ring (12) and, during a rotation of the shaft (4), senses a magnetic field which is influenced by the at least one locking ring (12), wherein n is an integer.

8 Claims, 11 Drawing Sheets

SENSOR ARRANGEMENT

BACKGROUND OF THE INVENTION

The invention relates to a sensor arrangement and to a method for determining a rotational angle.

In the field of torque sensors and rotational angle sensors, nowadays magnetic measuring principles are frequently used. In such torque sensors, a magnetic field which changes during a rotational movement is usually detected with Hall sensors, and an identified signal is converted into a rotational angle signal or torque signal.

According to the prior art, in order to implement a torque sensor, a magnet unit (MU) and a carrier of magnetic-flux-conducting rings (FTU="Flux Tube Unit") are mounted on two shafts which are connected to one another by means of a torsion bar. A sensor unit (SU) is attached to a surrounding housing by means of a plug or a circumferential plug-type connection. Here, it is not necessary to integrate an unambiguous steering angle measurement without a rotation counter.

Documents EP 2 078 930 A1 and EP 2 080 991 A1 each disclose rotational angle sensors with which it is possible to determine a rotation of a shaft relative to a stator. Here, the rotational angle sensor is a large gearwheel which surrounds the shaft and which interacts with a small gearwheel which is attached to the stator, with the result that when the shaft rotates the small gearwheel which is attached to the stator is also made to rotate. The rotational angle of the shaft can be determined in a first way from the rotation of the small gearwheel which is attached to the stator. Furthermore, a magnet is attached to the shaft, and when the shaft rotates said magnet also rotates. The magnetic field of this magnet which changes as a result of the rotation is sensed by magnetic sensors, with the result that the rotational angle of the shaft can therefore be sensed in a second way. In both specified documents there is also provision that the magnet which is attached to the shaft can be circular. Alternatively, it is also possible for a circumference of this magnet to be of elliptical design.

SUMMARY OF THE INVENTION

The invention relates to a refinement of a sensor arrangement, which can also be used as a steering angle sensor for a steering system of a motor vehicle and into which a torque sensor which measures according to a magnetic principle is integrated, wherein the sensor arrangement operates according to the Nonius principle, but requires just one gearwheel. Furthermore, the sensor arrangement does not require a rotation counter. As a result, inter alia, an inexpensive means of integrating a steering angle measurement for a plurality of rotations of a shaft without a rotation counter according to the Nonius principle into existing torque sensor concepts is made available, wherein at the same time a reduction in components which move and are therefore subject to wear is made possible.

Within the scope of the invention, there is also provision for the separation between a magnetic flux unit and a sensor unit to be eliminated. The sensor unit is here connected to the magnetic flux unit by means of a sliding bearing. A component with tolerances which are precisely matched to one another is therefore provided. The sliding bearing makes available the radial tolerance between the magnetic flux unit and the sensor unit. The axial tolerance is ensured by means of a locking ring of the sliding bearing with respect to the magnetic flux unit, which locking ring is embodied in the form of what is referred to as a sinusoidal ring.

The axial locking ring is therefore assigned a second function. This takes into account the fact that contemporary steering angle sensors without rotation counters which operate according to the Nonius principle have two measuring gearwheels with a different transmission ratio with respect to a master gearwheel which is located on a shaft. When one of these measuring gearwheels has an even-numbered transmission ratio with respect to the master gearwheel on the shaft, its rotational angle information can also be generated alternatively.

Against this background, in a refinement of the invention this function is transferred to at least one locking ring which is embodied as a sinusoidal ring, by virtue of the fact that the outer face and therefore the external shape of the sinusoidal ring corresponds to a rotation-modulated sinusoidal shape with an integral and/or even number of periods. When there is a rotation of the shaft, the outer face of the sinusoidal ring therefore influences a fixed magnetic field as a function of the penetration of the magnetic field by the sinusoidal ring, wherein this fixed magnetic field, which is generated by a permanent magnet, is modulated. This variation which is made available by modulation can be measured with a magnetic sensor which is embodied as a Hall IC or comparable AMR IC or circuit, for measuring the anisotropic magnetoresistive effect.

Therefore, it is possible to generate for the rotational angle measurement an integral and/or even-numbered sinusoidal signal by means of the sinusoidal ring, and to generate a second sinusoidal signal with an uneven-numbered transmission ratio by means of an individual measuring gearwheel.

The results for the sensor arrangement are very compact design with a small axial and radial overall height, wherein the Nonius principle is used to determine the rotational angle. Furthermore, a rotational angle signal, and therefore steering angle signal, is directly available after the voltage for the sensor arrangement has been switched on. The sensor arrangement can be implemented with a minimum number of components.

Usually, the invention requires, apart from the shaft, only one additional moving component, specifically the measuring gearwheel, with the result that only a small number of wearing parts are required. When a transmission is constructed as a crown gearhead unit a noncritical radial tolerance is provided between the measuring gearwheel and the magnetic flux unit. Furthermore, a short tolerance chain is necessary between a sensor unit with a printed circuit board and Hall sensors arranged thereon as magnetic sensors since the tolerances of the latter with respect to one another are directly adjusted by means of sliding bearings.

When the printed circuit is configured according to standard surface mounting technology (SMT), there is no need for any wired components using through hole technology (THT). Just one standardized sensor unit is required for all possible shaft diameters. The permanent magnet for the steering angle function is mounted on the locking ring, with the result that the largest possible use of the printed circuit board is possible, which is more cost-effective than mounting a magnet on the sinusoidal ring. Furthermore, a relatively simple design and connection technology is provided.

The sensor arrangement according to the invention is designed to carry out all the steps of the proposed method. In this context, individual steps of this method can also be carried out by individual components of the sensor arrangement. Furthermore, functions of the sensor arrangement or functions of individual components of the sensor arrangement can be implemented as steps of the method. Moreover, it is possible for steps of the method to be implemented as functions of at least one component of the sensor arrangement or of the entire sensor arrangement.

BRIEF DESCRIPTION OF THE DRAWINGS

Further advantages and refinements of the invention emerge from the description and the appended drawings.

Of course, the features which are mentioned above and which are to be explained below can be used not only in the respectively specified combination but also in other combinations or alone without departing from the scope of the present invention.

DETAILED DESCRIPTION

The invention is illustrated schematically in the drawings on the basis of embodiments and will be described in detail below with reference to the drawings.

The figures are described jointly and comprehensively and identical reference symbols denote identical components.

Various details of an embodiment of the sensor arrangement 2 according to the invention which is suitable for determining a rotational angle of the shaft 4 which rotates about an axis 6 are illustrated in FIGS. 1a, 1b, 1c, 2a, 2b from various perspectives.

There is provision for the shaft 4 to be surrounded by a sleeve 8 which is connected to this shaft 4 in a rotationally fixed fashion. A master gearwheel 10 is arranged on this sleeve 8. Furthermore, what is referred to as a locking ring 12 which is embodied as a sinusoidal ring is attached in a rotationally fixed fashion to the sleeve 8 and therefore arranged thereon. Furthermore, the sleeve 8 has what is referred to as a magnetic flux unit 14 which comprises two flux conducting rings 16, 18 and can be manufactured using injection molding technology.

Between the sinusoidal ring 12 and the magnetic flux unit 14 a sliding bearing 20 is arranged which is attached here to a component (not illustrated further), for example a surrounding sensor housing, by means of attachment elements 46. The sliding bearing 20 can be manufactured by injection molding and at the same time as the bearing function on the sleeve 8 it also makes available attachment possibilities for a measuring gearwheel 24 and a sensor unit 28. When the shaft 4 rotates about the axis 6 the shaft 4 therefore rotates, with the sleeve 8 which surrounds the magnetic flux unit 14 and on which the master gearwheel 10 and the sinusoidal ring are arranged, relative to the components and therefore also to the sliding bearing 20. In this context, the locking ring 12 locks the sliding bearing 20 in the direction of the magnetic flux unit 14 in the axial direction.

The measuring gearwheel 24, into which a permanent magnet 26 is integrated, is rotatably attached to the sliding bearing 20 by means of a clip attachment 22. Teeth of this measuring gearwheel 24 engage in teeth of the master gearwheel 10. As a result, when the shaft 4 rotates about the axis 6, the measuring gearwheel 24 is also made to rotate. The master gearwheel 10 and the measuring gearwheel 24 are embodied here as components of a crown gearhead unit. In this context, teeth of the master gearwheel 10 are oriented in the axial direction of the shaft 4. An axis of the measuring gearwheel 24 is oriented perpendicularly with respect to the axis 6 of the shaft 4.

Furthermore, the sensor unit 28 is arranged on the sliding bearing 20 and therefore also on the component which is not illustrated further, said sensor unit 28 comprising a printed circuit board 30 on which here a total of three magnetic sensors 32, 34, 36 and a permanent magnet 38 are arranged.

Figures 1A, 1B:
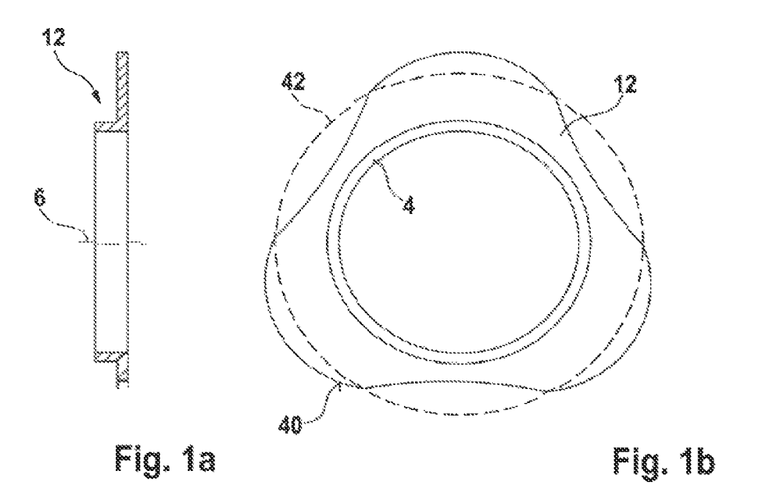
FIG. 1 shows first details of an embodiment of the sensor arrangement according to the invention from various perspectives.

Details on the refinement of the locking ring 12 which is embodied as a sinusoidal ring can be seen, in particular, in FIG. 1b. Here, FIG. 1b shows that an outer face 40 of the locking ring 12 has a radius $r(\phi)=r_0+r_A \sin(n\phi/360°)$, wherein in this case n=3 and therefore is an integer and $r_0$ corresponds to the radius of a circle 42 which can also be referred to here as what is referred to as a circular sinusoidal zero crossing. The amplitude with which the radius $r(\phi)$ changes is defined by $r_A$. In the described embodiment of the sensor arrangement 2 there is provision that the locking ring 12 is formed from ferromagnetic material.

When the shaft 4 rotates about a rotational angle, the locking ring 12 is rotated synchronously with the shaft 4. It results in turn from this that the locking ring 12 is rotated relative to the sensor unit 28 and therefore also to the permanent magnet 38 and to the first magnetic sensor 32 which is arranged on the printed circuit board 30 opposite said permanent magnet 38. A distance between the outer face 40 of the locking ring 12 and the first magnetic sensor 32 changes periodically during a rotation of the shaft 4. As a result of the movement of the locking ring 12, the magnetic field which is generated by the permanent magnet 38 is modulated and therefore varied in a spatially sinusoidal fashion. This spatial variation of the magnetic field of the permanent magnet 38 is sensed by the first magnetic sensor 32, and a first signal for determining the rotational angle of the shaft 4 is made available therefrom.

During the rotation of the shaft 4, the measuring gearwheel 24 is also rotated by means of the master gearwheel 10 as a second module for sensing the rotational angle of the shaft 4, and therefore the permanent magnet 26 which is integrated into the measuring gearwheel 24 is also rotated. A magnetic field which is generated by the permanent magnet 26 is therefore also made to rotate and is sensed by the second magnetic sensor 34. In this way, a second signal is made available for determining the rotational angle of the shaft 4.

The third magnetic sensor 36 is arranged between the two flux conducting rings 16, 18 of the magnetic flux unit 14. Details on the function thereof are described, inter alia, with reference to the following FIG. 3.

The three magnetic sensors 32, 34, 36 which are arranged on the printed circuit board 30 as components of the sensor unit 28 can be embodied as Hall sensors or AMR sensors for measuring the anisotropic magnetoresistive effect.

Figure 1C:
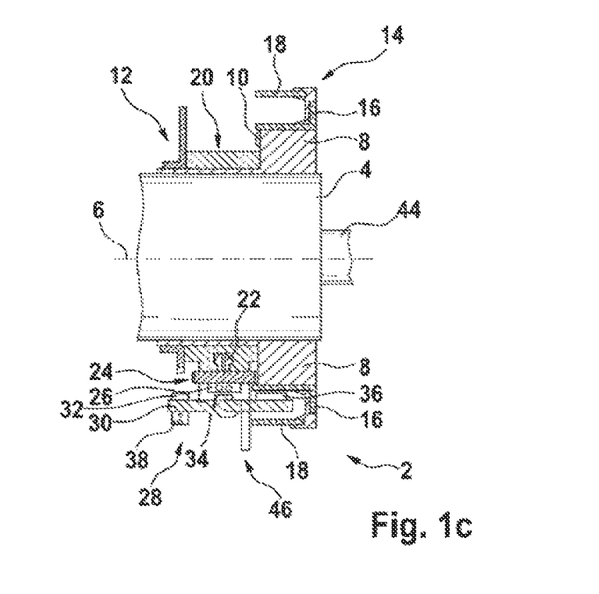

Furthermore, FIG. 1c shows a torsion bar 44 which is axially connected to the shaft 4, as well as attachment elements 46 which are connected to the sliding ring 20 and to the sensor unit 28, and by means of which the sliding bearing 20 and the sensor unit 28 with the printed circuit board 30 are to be attached to the component (not illustrated).

The locking ring 12 is illustrated schematically in FIG. 1a in a sectional illustration and in FIG. 1b in a plan view. FIG. 1c shows this sinusoidal ring in combination with the other components of the sensor arrangement 2 and of the shaft 4 in a sectional view. As a rule, the sleeve 8 makes available a mounting face for the locking ring 12 and the sliding bearing 20. There is provision for the axial bearing clearance of the sliding bearing 20 to be bounded by the locking ring 12.

Figure 2A:
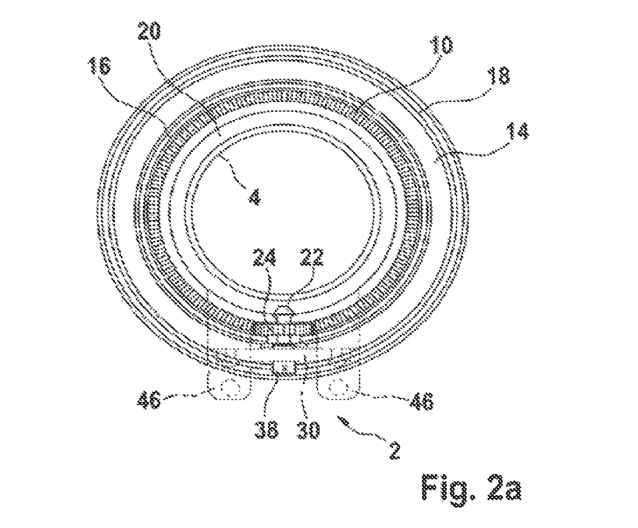
FIG. 2 is a schematic illustration of second details of the sensor arrangement according to the invention.
Figure 2B:
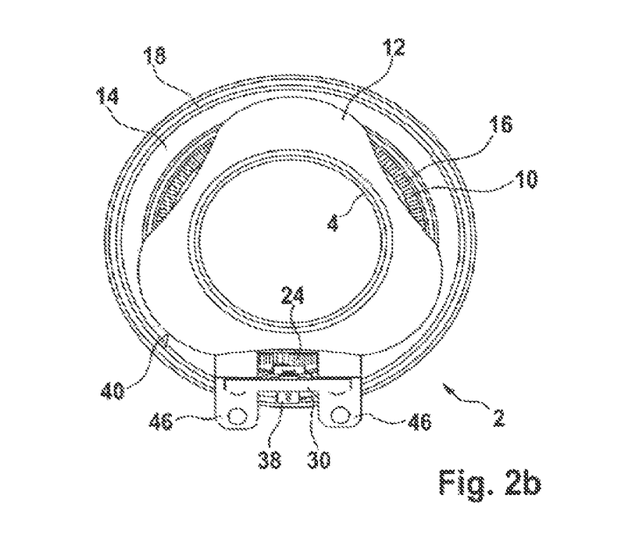
Figure 3:
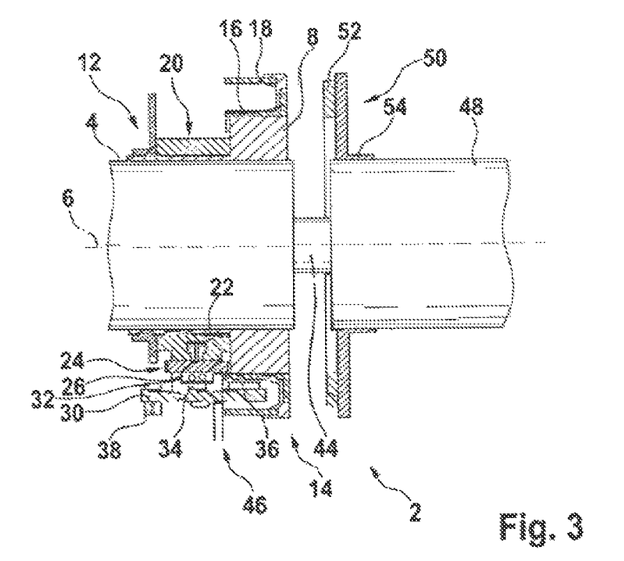
FIG. 3 shows third details of the sensor arrangement according to the invention in a schematic illustration.

FIG. 3 shows, in addition to the components of the sensor arrangement 2 which have already been presented in FIGS. 1 and 2, further components with which a torque between the first shaft 4 and a second shaft 48, which can rotate about a common axis 6 and are connected to one another by means of the torsion bar 44, can be determined. For this purpose, what is referred to as a magnet unit 50 is provided on the second shaft 48, said magnet unit 50 comprising a magnetic pole wheel 52 which is attached via a sleeve 54 to the second shaft 48 and can therefore rotate synchronously with the second shaft 48.

The alternating magnetic field which is generated by the magnetic pole wheel 52 generates, in the event of torsion or twisting of the torsion bar 44, a change in the magnetic flux in the flux conducting rings 16, 18 of the magnetic flux unit 14 which can be detected by the third magnetic sensor 36 and which constitutes a measure of the torsion between the two shafts 4, 48. A torque between the two shafts 4, 48 can be determined by means of the magnetic flux unit 14 and the third magnetic sensor 52.

Figure 4:
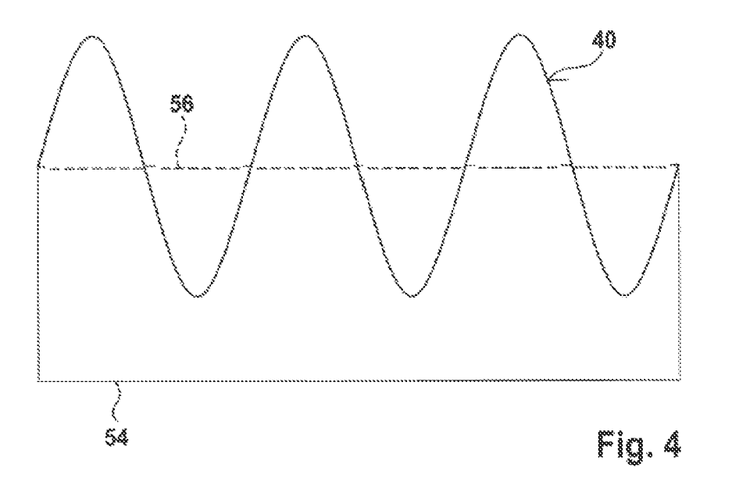
FIG. 4 is a diagram showing a refinement of a sinusoidal ring as a component of the sensor arrangement according to the invention.

The diagram illustrated in FIG. 4 clarifies a periodic change in the radius $r(\phi)$ of the outer face 40 of the locking ring 12, embodied as a sinusoidal ring, in the so-called developed form, wherein the outer face 40 is projected by polar coordinates onto Cartesian coordinates. A circumference 54 of the shaft 4 and a circumference 56 of the ring 42 are illustrated relative to this outer face 40. The outer face 40 comprises at least one integral period of a sinusoidal function—three complete periods in this example. The locking ring 12 as a component of the sensor unit 2 is manufactured from ferromagnetic material, for example from NiFe sheet metal.

Figure 5:
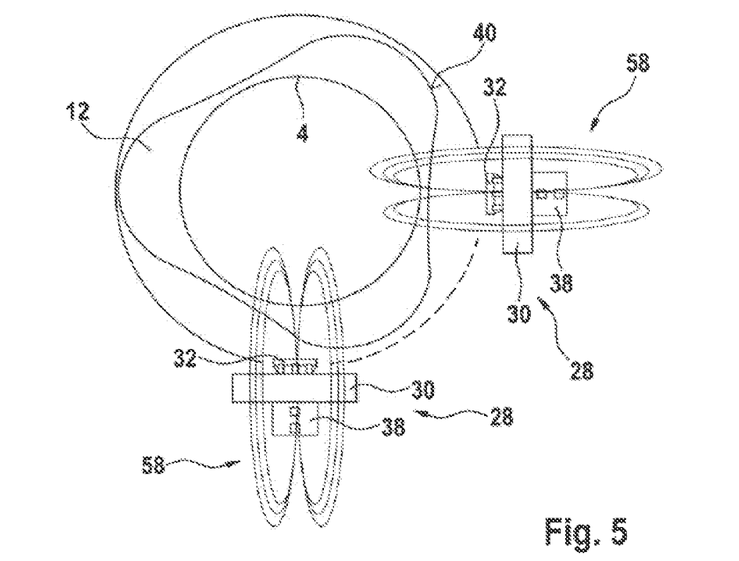
FIG. 5 is a schematic illustration of a fourth detail of the sensor arrangement according to the invention.

The detail of the embodiment of the sensor arrangement according to the invention which is shown in FIG. 5 comprises two sensor units 28 with two magnetic sensors 32 which are arranged offset here by 90° with respect to the shaft 4 on one printed circuit board 30 each, and permanent magnets 38 which are arranged opposite on the printed circuit board 30.

There is provision here that a sinusoidal function with three periods is mapped on the outer face 40 of the locking ring 12. At least one magnetic sensor 32 is usually arranged near the maximum circumference of the sinusoidal ring 12, and the permanent magnet 38 is usually arranged stacked directly behind it. The magnetic field 58 of, in each case, one permanent magnet 38 is measured by one of the magnetic sensors 32, wherein the magnetic field is influenced in a spatially sinusoidal fashion by the locking ring 12, i.e. as a function of the distance from a position of the gear rim 12 a relatively large and a relatively small magnet flux are alternately conducted into the magnetic sensor 32. When there is a rotational movement of the locking ring 12, the magnetic field 58 therefore changes and generates a sinusoidal signal in the magnetic sensor 32.

Since the change in the signal is smallest at the maximum and minimum of the sine (that is to say at 90° and 270°), an optional second sensor unit 28 can be arranged in such a way that the change in the signal in one of the two sensor units 28 is always in an edge of a sine. The optional second sensor unit 28 serves here to increase the measurement resolution.

Figure 6:
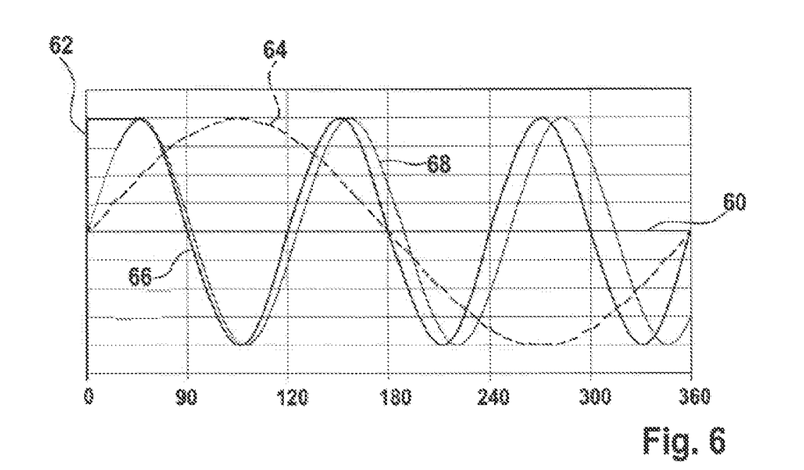
FIG. 6 is a first diagram of an embodiment of the method according to the invention with the sensor arrangement according to the invention.

The diagram in FIG. 6 comprises an abscissa 60 along which an angle is plotted in degrees. Values of three sinusoidal curves 64, 66, 68 are plotted along an ordinate 62. A first curve 64 in the diagram in FIG. 6 shows a sinusoidal rotational movement of the shaft 4. A second curve 66 clarifies a profile of the circumference of the outer face 40 of the locking ring 12. A third curve 68 clarifies a sinusoidal rotation of the measuring gearwheel 24 with 2.9 periods here.

The diagram in FIG. 6 illustrates a function of the rotational angle measurement according to the Nonius principle. In this example, a rotation of the shaft 4 generates three complete (integral) periods (second curve 66) in the first magnetic sensor 32, which is assigned to the locking ring 12. The measuring gearwheel 24, arranged on the sensor unit 28, of the crown gearhead unit has a transmission ratio which is not equal to the transmission ratio of the sinusoidal ring, as a rule is not integral, wherein, when the shaft 4 rotates, the measuring gearwheel 24 carries out 2.9 rotations in the example shown. The permanent magnet 26 which rotates with the measuring gearwheel 24 therefore also generates in the assigned second magnetic sensor 34 a sine function with a frequency (third curve 56) which deviates at least slightly from the frequency of a sine function which is illustrated by the second curve 66. By combining the two sine functions which have different frequencies it is also possible to calculate an unambiguous rotational angle by means of a plurality of rotations of the shaft 4.

The measuring gearwheel 24 usually carries out m+c rotations when the master gearwheel 10 carries out a rotation. Here, m is an integer, for example $m \geq 2$ and $0 < c < 1$. In the present example, m=2 and c=0.9. Furthermore, there is provision that when the shaft 4 rotates, n periods are covered by the locking ring 12 and m+c periods are covered by the measuring gearwheel 24. The locking ring 12 and the measuring gearwheel 24 therefore always have two different periodicities which differ from one another by n−(m+c) since n and m are integers and $0 < c < 1$. In the present example, the periods differ from one another by 0.1, with the result that by virtue of this difference it is possible to use the Nonius principle for determining the rotational angle.

In this context, the even-numbered sine signal is not generated by a gearwheel but rather by the locking ring 12 which performs as a second function the axial locking of the sliding bearing 20 of the sensor unit 28 on the magnetic flux unit 14. A non-integral curve for the second sine signal is made available by the measuring gearwheel 24.

Figure 7:
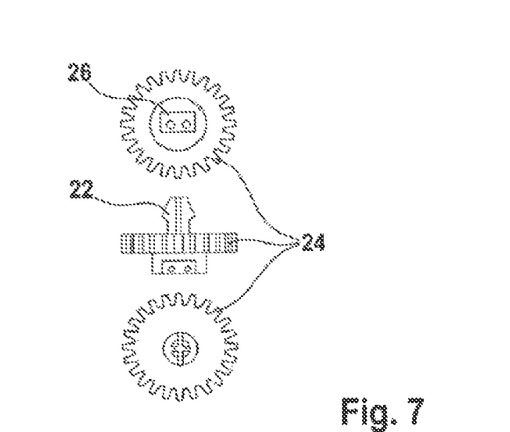
FIG. 7 is a schematic illustration of a fifth detail of the sensor arrangement according to the invention.

Details on the measuring gearwheel 24 of the crown gearhead unit with integrated permanent magnet 26 and the clip attachment 22 for providing an attachment bearing function on the sliding bearing 20 are illustrated schematically in FIG. 7.

Figure 8:
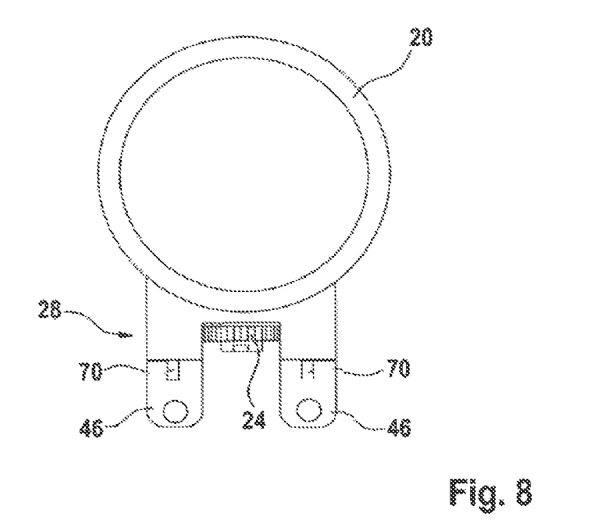
FIG. 8 is a schematic illustration of a sixth detail of the sensor arrangement according to the invention.

FIG. 8 schematically illustrates the sliding bearing 20, the attachment elements 46 which are connected thereto and the measuring gearwheel 24 as a component of the sensor unit 28.

There is provision that the sensor unit 28 is positioned so as to be rotatable relative to the shaft 4 by means of the sliding bearing 20, between the magnetic flux unit 14 and the locking ring 12 which is embodied as a sinusoidal ring. The measuring gearwheel 24 for the Nonius function is arranged on the sensor unit 28 in order to measure the rotational angle. An attachment possibility for the printed circuit board 30 is provided on the sliding bearing 20. In this example, the attachment possibility comprises plastic pegs 70 to which the printed circuit board 30 is attached, for example, by warm caulking. The sensor unit 28 is locked radially on a surrounding component or housing. The two attachment elements 46 are provided for this purpose.

Figure 9A:
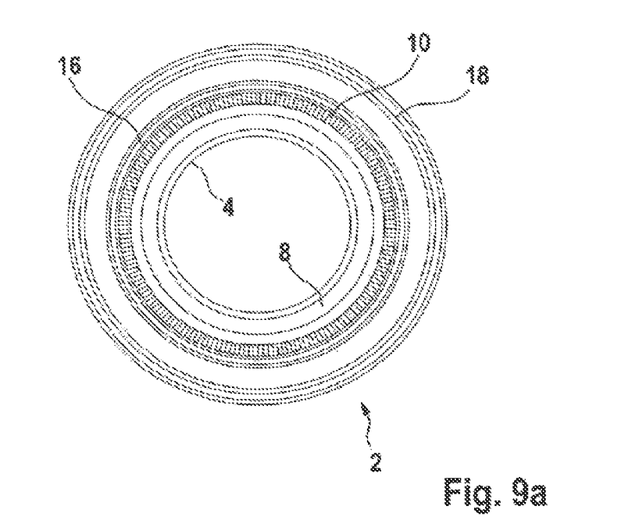
FIG. 9 is a schematic illustration of a seventh detail of the sensor arrangement according to the invention.

FIG. 9a shows the components of the sensor arrangement 2 which are already illustrated in plan view in FIG. 2a, without the sliding bearing 20 and the attachment elements 46.

Figure 9B:
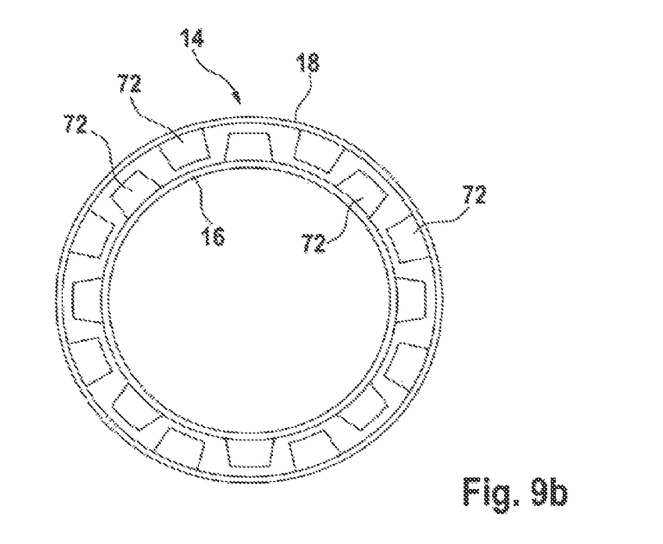

FIG. 9b is a schematic illustration of details of the flux conducting rings 16, 18, formed from ferromagnetic material, of the magnetic flux unit 14. Here, the two flux conducting rings 16, 18 comprise fingers 72 which engage one in the other.

Figure 10:
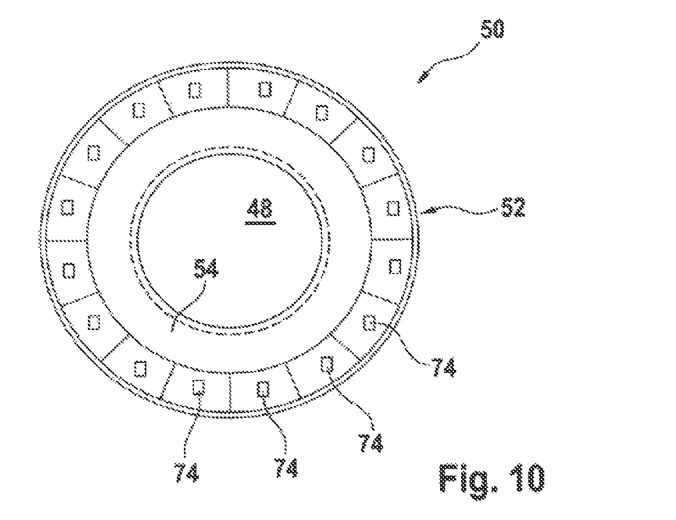
FIG. 10 is a schematic illustration of an eighth detail of the sensor arrangement according to the invention.

FIG. 10 is a schematic illustration of a plan view of the magnetic pole wheel 52 of the magnet unit 50, which magnetic pole wheel 52 is attached to the second shaft 48 by means of the sleeve 54.

The magnetic pole wheel 52 comprises a plurality of magnetic poles 74 which are arranged radially in an alternating fashion and which generate a magnetic field. When the second shaft 48 rotates relative to the first shaft 4, this magnetic field is amplified by the magnetic flux unit 14 and detected by the third magnetic sensor 36, with the result that a differential angle and therefore a torque between the two shafts 4, 48 can be determined.

Figure 11:
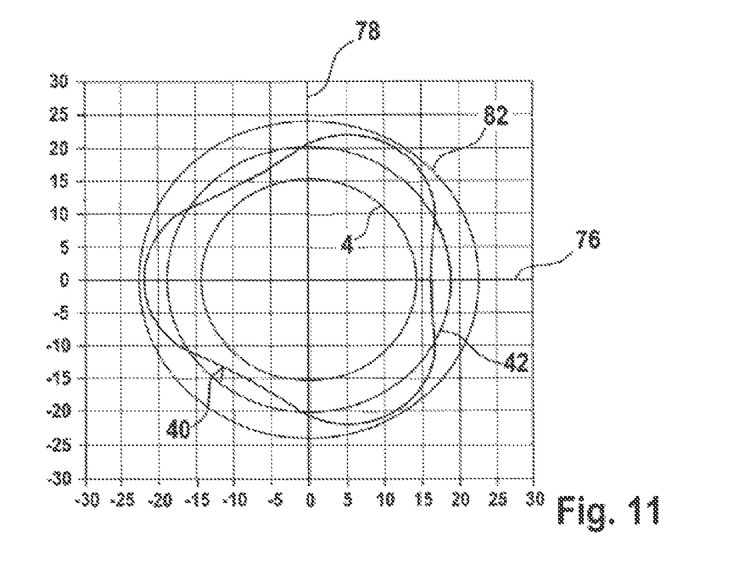
FIG. 11 is a second diagram of the execution of the method according to the invention.

The diagram illustrated in FIG. 11 comprises an abscissa 76 and an ordinate 78 along which radii are plotted in millimeters. There is provision here that the abscissa 76 about the ordinate 78 intersects at the center point of the shaft 4, through which center point the axis 6 of the shaft 4 also runs. Furthermore, the outer face 40 of the locking ring 12 and the circle 42, which represents the sine zero crossing of the outer face 40, are represented in the diagram. A position of the first magnetic sensor 32 is indicated by a second circle 82, said magnetic sensor 32 sensing, during a determination of the rotational angle of the shaft 4, a spatial modulation caused by the locking ring 12 and therefore a variation in the magnetic field 58 generated by the permanent magnet 38.

Figure 12:
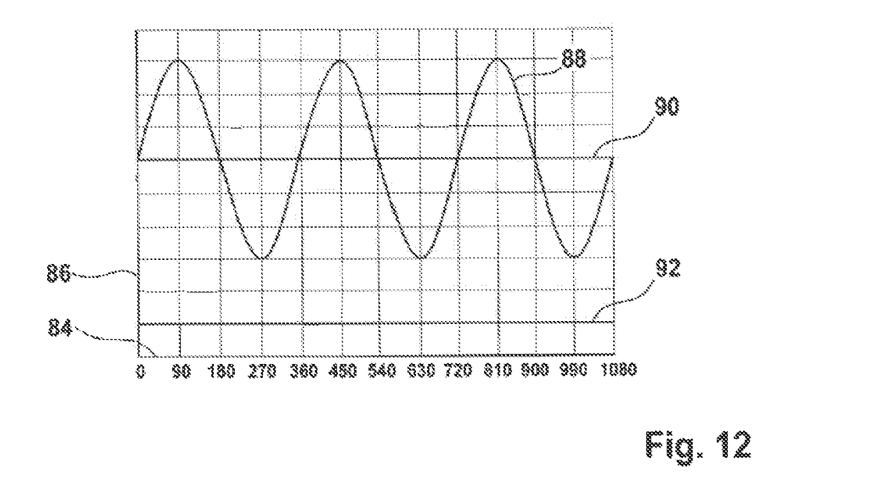
FIG. 12 is a third diagram of the execution of the method according to the invention.

The diagram illustrated in FIG. 12 comprises an abscissa 84 along which angles are plotted, and an ordinate 86 along which radii are plotted in millimeters. The outer face 40 of the locking ring 12 is indicated in the diagram by a sinusoidal curve 88. A mean value of the sinusoidal curve 88, which is 20 mm here, is indicated by a first straight line 90. A second straight line 92 indicates a diameter of the shaft 4, which is 15 mm here. The radius, indicated by the first curve 88, of the outer face 40 of the locking ring 12 varies between a minimum of 17 mm and a maximum of 23 mm.

Accordingly, the sensor arrangement 2 for determining a rotational angle of a shaft 4 comprises at least one locking ring 12 which is arranged on the shaft 4 and therefore attached thereto, wherein a radius of an outer face of the at least one locking ring 12 changes with a period of $n\phi/360°$. Here, a value of the radius varies with a periodic function $f(n\phi/360°)$. The sensor arrangement 2 has at least one first fixedly installed magnetic sensor 32 as a component of a sensor unit 28, which magnetic sensor 32 is assigned to the at least one locking ring 12 and, during a rotation of the shaft 4, senses a magnetic field 58 which is modulated in a spatially periodic fashion by the at least one locking ring 12, and therefore influenced, and is generated by a permanent magnet 38. Usually, n for determining the period of the outer face 40 of the locking ring 12 is an integer, where n is for example $\geq 2$.

In a refinement, the at least one locking ring 12 can be embodied in a star shape with n prongs or n vertices. Furthermore, the at least one locking ring 12 is made of ferromagnetic material. If two magnetic sensors 32 which sense a modulation of two permanent magnets 38 are provided for detecting a movement of the at least one locking ring 12, the magnetic sensors 32 and the permanent magnets 38 are arranged offset with respect to one another by $90°+2k\ 90°$.

As a rule, the sensor arrangement 2 comprises the at least one first fixedly installed magnetic sensor 32 which makes available at least one first signal for determining the rotational angle. Furthermore, the sensor arrangement 2 comprises an additional module for sensing the rotation of the shaft 4 and at least one second fixedly installed sensor which is assigned to the additional module, senses a movement of the additional module and makes available therefrom at least one second signal for determining the rotational angle.

As is illustrated schematically in FIGS. 1 to 12, the sensor arrangement 2 can have a master gearwheel 10 which is arranged on the shaft 4, and the fixedly installed measuring gearwheel 24 as an additional module, wherein teeth of the master gearwheel 10 and of the measuring gearwheel 24 engage one in the other, and the measuring gearwheel 24 is also made to rotate when the shaft 4 rotates. The sensor arrangement 2 makes available the at least one second signal from the rotation of the measuring gearwheel 24 in order to determine the rotational angle.

In this context, the measuring gearwheel carries out m+c rotations when the shaft 4 carries out a rotation, wherein m is an integer and $0<c<1$, for example c=0.5 or 0.9.

In order to determine the rotational angle, the magnetic field 58 which is influenced by the locking ring 12 is sensed by at least one fixedly installed magnetic sensor 38. Here, a first value for the rotational angle of the shaft 4 is made available with the at least one fixedly installed magnetic sensor 32 by means of a first signal. A movement of the additional module is sensed by at least one second fixedly installed sensor in order to sense the rotation of the shaft 4, wherein at least one second value for determining the rotational angle is made available with the at least one second fixedly installed sensor by means of a second signal. In this context, the at least one first value and the at least one second value are correlated with one another according to the Nonius principle.

Figure 13A:
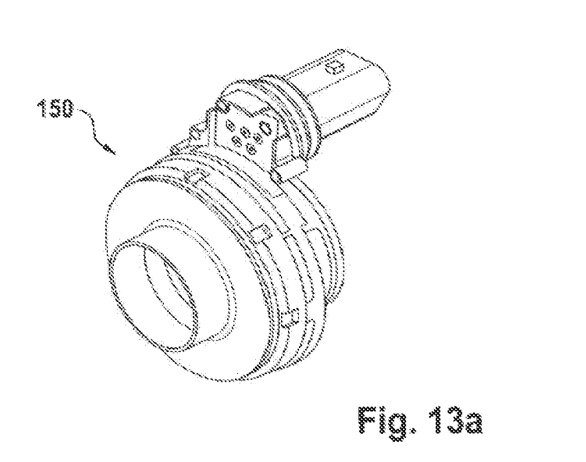
FIG. 13 shows first details of a torque sensor known from the prior art.
Figure 13B:
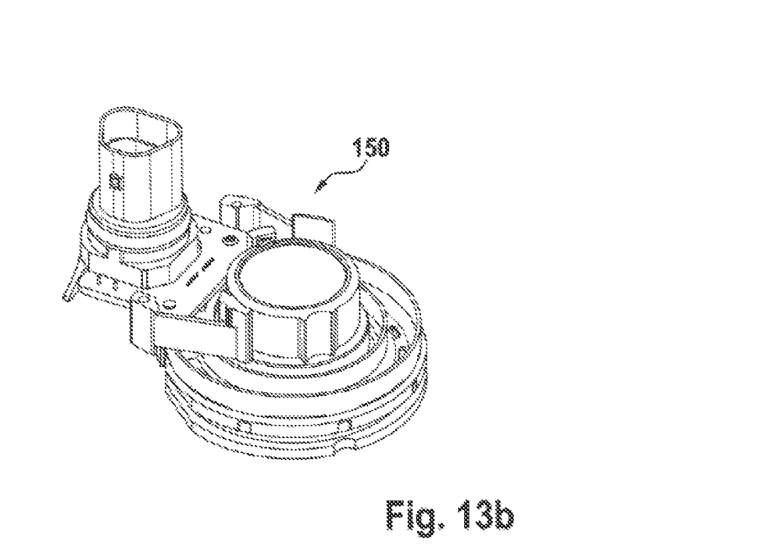
Figure 13C:
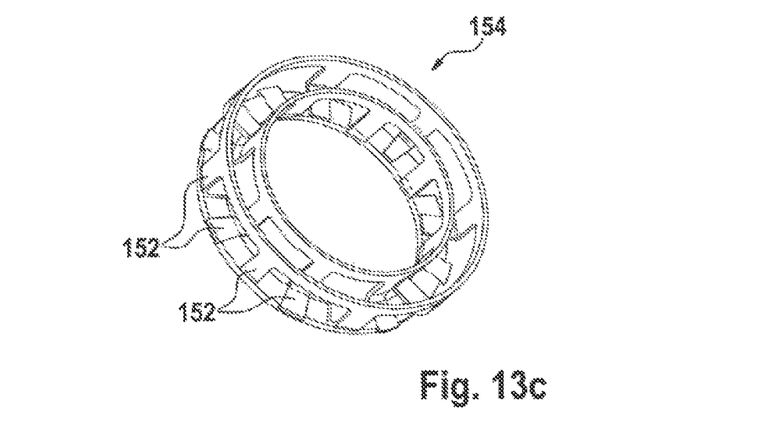

FIG. 13 is a schematic illustration of an arrangement 150 which is known from the prior art and has the purpose of measuring a torque, which arrangement 150 comprises two measuring rings 154 with bent fingers 152 composed of NiFe sheet metal. This arrangement 150 is referred to as a magnetically measuring torque sensor TSS-1 from Robert Bosch GmbH.

Figure 14A:
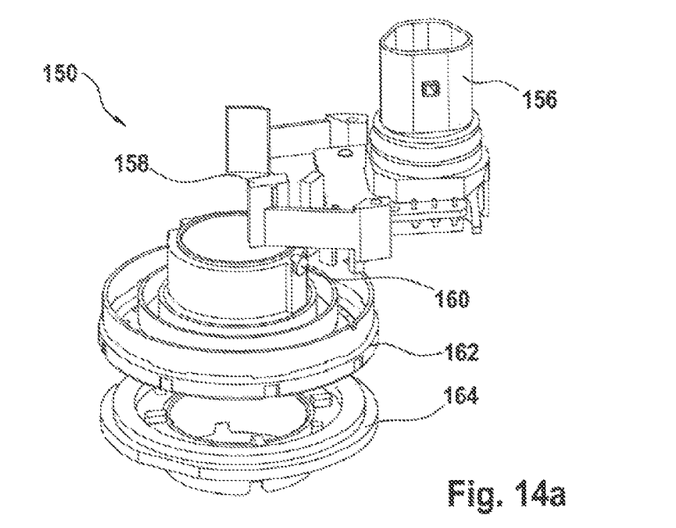
FIG. 14 shows second details of the torque sensor known from the prior art.
Figure 14B:
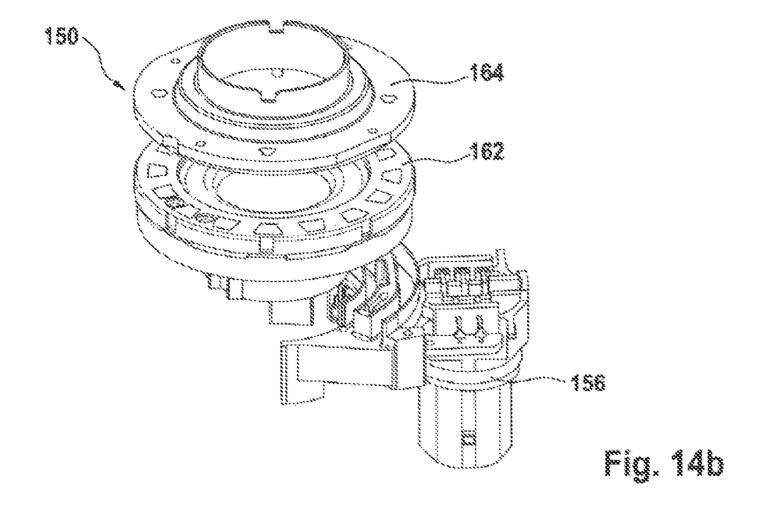

FIG. 14 shows details of the arrangement 150 from FIG. 13, specifically a sensor unit 156, an index Hall element 158, an index magnet 160, what is referred to as a flex tube unit 162 which surrounds the two measuring rings 154, and a magnet unit 164.

In order to manufacture this arrangement 150, it is necessary to use, inter alia, a scoop soldering method or wave soldering method, which are generally more complex and expensive than a standard reflow process. In this concept, an additional integration of a steering angle measurement is not possible.

Figure 15:
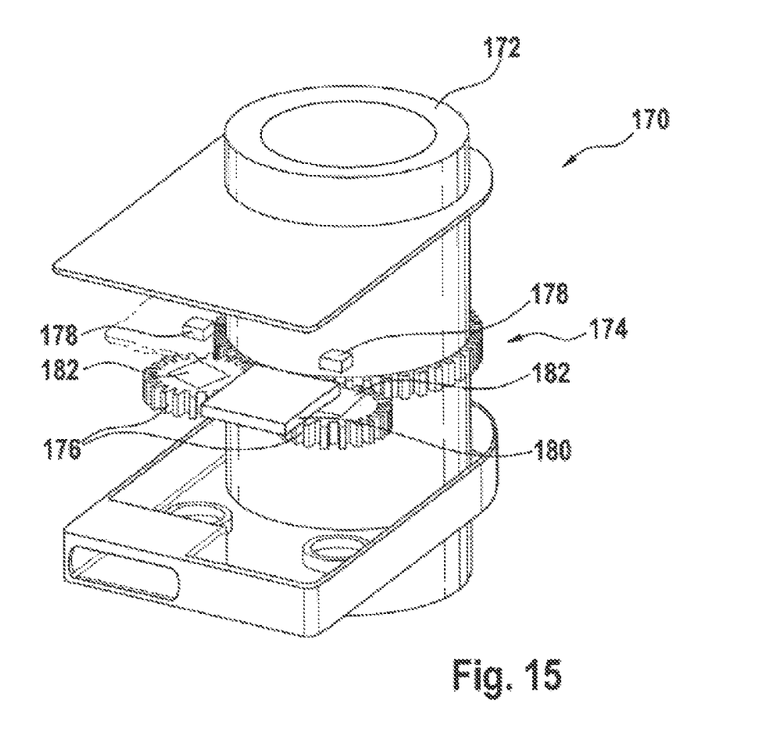
FIG. 15 is a schematic illustration of a steering angle sensor which is known from the prior art.

Furthermore, the streering angle sensor 170 which is illustrated schematically in FIG. 15 is known from the prior art, which steering angle sensor 170 can be used to determine a rotational angle and therefore the steering angle of a shaft which is embodied as a steering column 172. This steering angle sensor 170 comprises a master gearwheel 174, two measuring gearwheels 176, magnets 178, a circuit which is embodied as a microcontroller, as well as sensor elements 182 which are embodied here as GMR elements with analogue/digital converters for making available a serial data transmission.

This steering angle sensor functions according to the Nonius principle. There is provision here that the measuring gearwheels 176 have a different number of teeth and therefore have different transmission ratios, with the result that the measuring gearwheels 176 change their rotational position relative to the master gearwheel 174 at different speeds.

On the basis of the combination of the two current angles which are determined by the measuring gearwheels 176 it is possible to calculate the total angle by means of a mathematical function. Therefore, with this measuring principle it is possible to cover a measuring range of a plurality of rotations of a shaft without a rotation counter.

The invention claimed is:

1. A sensor arrangement for determining a rotational angle of a shaft (4), the sensor arrangement comprising:
    a shaft (4) having at least one locking ring (12) embodied as a sinusoidal ring, wherein an outer face (40) of the sinusoidal ring has a radius of $r(\phi)=r_0+r_A \sin(n\phi/360°)$, where $r_0$ is a radius of a circle that defines the zero crossing points of the sinusoidal ring, $r_A$ is a constant which determines the amount the radii of the sinusoidal ring varies from the radius $r_0$, n is a number of complete periods, and $\phi/360°$ is an angle that varies between 0° and 360°, the at least one locking ring (12) arranged on the shaft (4), and
    at least one first fixedly installed magnetic sensor (32) which is assigned to the at least one locking ring (12) and, during a rotation of the shaft (4), senses a magnetic field (58) which is influenced by the at least one locking ring (12), wherein n is an integer.

2. The sensor arrangement according to claim 1, in which the at least one locking ring (12) is formed from ferromagnetic material, and influences a magnetic field (58) which is generated by a permanent magnet (38).

3. The sensor arrangement according to claim 1, in which at least one first fixedly installed magnetic sensor (32) makes available at least one first signal for determining the rotational angle, wherein the sensor arrangement (2) has an additional module for sensing the rotation of the shaft (4) and at least one second fixedly installed sensor which is assigned to the additional module, wherein the at least one second fixedly installed sensor senses a movement of the additional module and makes available therefrom at least one second signal for determining the rotational angle.

4. The sensor arrangement according to claim 3, which has a master gearwheel (10) which is arranged on the shaft (4), and a fixedly installed measuring gearwheel (24) as an additional module, wherein teeth of the master gearwheel (10) and of the measuring gearwheel (24) engage one in the other, wherein the measuring gearwheel (24) is also made to rotate when the shaft (4) rotates, and wherein the sensor arrangement (2) makes available the at least one second signal from the rotation of the measuring gearwheel (24) in order to determine the rotational angle.

5. The sensor arrangement according to claim 4, in which the measuring gearwheel (24) carries out m+c rotations when the shaft carries out a rotation, wherein m is an integer and 0<c<1.

6. A method for determining a rotational angle of a shaft (4), in which at least one locking ring (12) attached to the shaft (4) includes a sinusoidal ring, wherein an outer face (40) of the sinusoidal ring has a radius of $r(\phi)=r_0+r_A \sin(n\phi/360°)$, where $r_0$ is a radius of a circle that defines the zero crossing points of the sinusoidal ring, $r_A$ is a constant which determines the amount the radii of the sinusoidal ring varies from the radius $r_0$, n is a number of complete periods, and $\phi/360°$ is an angle that varies between 0° and 360°, and wherein a magnetic field (58) which is influenced by the at least one locking ring (12) is sensed, where n is an integer.

7. The method according to claim 6, in which the magnetic field (58) which is influenced by the at least one locking ring (12) is sensed by at least one fixedly installed magnetic sensor (32), wherein at least one first value for the rotational angle of the shaft (4) is made available with the at least one fixedly installed magnetic sensor (32) by means of one first signal, and in which a movement of an additional module is sensed by at least one second fixedly installed sensor in order to sense the rotation of the shaft (4), wherein at least one second value for determining the rotational angle is made available with the at least one second fixedly installed sensor by means of one second signal.

8. The method according to claim 7, in which the at least one first value and the at least one second value are correlated with one another according to the Nonius principle.

* * * * *